United States Patent
Samuel et al.

(10) Patent No.: US 11,422,788 B2
(45) Date of Patent: Aug. 23, 2022

(54) DEPLOYING FIRMWARE UPDATES

(71) Applicant: Dell Products L.P., Round Rock, TX (US)

(72) Inventors: Balasingh P. Samuel, Round Rock, TX (US); Sungsup Lee, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/995,561

(22) Filed: Aug. 17, 2020

(65) Prior Publication Data
US 2022/0050671 A1   Feb. 17, 2022

(51) Int. Cl.
*G06F 8/65* (2018.01)
*G06F 9/4401* (2018.01)
*G06F 8/71* (2018.01)

(52) U.S. Cl.
CPC .......... *G06F 8/65* (2013.01); *G06F 8/71* (2013.01); *G06F 9/4401* (2013.01)

(58) Field of Classification Search
CPC . G06F 8/65; G06F 8/71; G06F 9/4401; G06F 8/654; G06F 21/572; G06F 21/575
See application file for complete search history.

(56) References Cited

U.S. PATENT DOCUMENTS

| | | | | |
|---|---|---|---|---|
| 8,707,297 | B2* | 4/2014 | Brown | G06F 8/65 717/178 |
| 2004/0078793 | A1* | 4/2004 | Bragulla | G06F 8/656 717/174 |
| 2005/0257214 | A1* | 11/2005 | Moshir | G06F 8/65 717/171 |
| 2012/0124568 | A1* | 5/2012 | Fallon | G06F 9/453 717/169 |
| 2017/0255775 | A1* | 9/2017 | Sorresso | G06F 21/575 |
| 2020/0082115 | A1* | 3/2020 | Ball | H04L 63/0407 |
| 2020/0310774 | A1* | 10/2020 | Zhu | G06F 9/4401 |
| 2021/0284211 | A1* | 9/2021 | Kott | G05B 9/02 |

OTHER PUBLICATIONS

Rahul Dhobi et al.; Secure Firmware Update over the Air using Trustzone; i-PACT; 4 pages; retrieved on Jun. 21, 2022 (Year: 2019).*
Richard Wilkins et al.; UEFI Secure Boot in Modern Computer Security Solutions; vx-underground; 10 pages; retrieved on Jun. 21, 2022 (Year: 2013).*

* cited by examiner

*Primary Examiner* — S. Sough
*Assistant Examiner* — Cuong V Luu
(74) *Attorney, Agent, or Firm* — Kirton McConkie; Brian Tucker

(57) ABSTRACT

Firmware updates are packaged in a manner that enables a firmware update utility to be executed to provide control functionality for deployment of the firmware updates while leveraging an operating system provided update framework to deliver the firmware updates to pre-boot environment. Accordingly, control over the deployment of the firmware updates is provided without difficulties and security risks of employing a custom kernel-mode driver to deliver the firmware updates.

10 Claims, 10 Drawing Sheets

DEPLOYING FIRMWARE UPDATES

CROSS-REFERENCE TO RELATED APPLICATIONS

N/A

BACKGROUND

Windows Update is a service provided with the Windows operating system that may be used to deliver software and firmware updates to a computing device. Even though it may be used to deploy firmware updates, some vendors do not use Windows Update because it provides limited control over the update process. For example, when deploying a firmware update through Windows Update, an administrator or end user has little, if any, control over the installation of the firmware update on an individual computing device and may therefore not be able to perform any prerequisite checks (e.g., a bi-locker check, a power level check or any other platform-specific check), display a user interface (e.g., to present release notes, security updates or other critical instructions), change the ordering of firmware updates or removing a particular firmware update from the installation, etc. Due to such limitations, some vendors have developed custom firmware update utilities that provide functionality to allow administrators to have control over the firmware update process (e.g., the Dell Flash Update Utility).

One part of deploying a firmware update on a computing device is conveying the firmware update from the operating system context, in which Windows Update or a custom firmware update utility runs, to the pre-boot environment where the firmware update will be installed. To accomplish this with a custom firmware update utility, a custom kernel-mode driver has traditionally been used. Because it runs in kernel mode, the custom kernel-mode driver will have direct access to physical memory to store the firmware update in accordance with the governing specifications.

Although effective, using a custom kernel-mode driver creates security vulnerabilities and additional difficulties. For example, many customers may be unwilling to use a custom update utility because of actual or perceived vulnerabilities of using a kernel-mode driver. In fact, it is believed that Microsoft's Windows Core OS will not support custom kernel-mode drivers for security reasons. Additionally, it is more difficult and time consuming to develop and package kernel-mode drivers. For example, Windows requires any kernel-mode driver to be developed in accordance with the kernel driver model, including being signed in a particular way. Therefore, whenever Microsoft updates its requirements or model, the vendor of the custom firmware update utility will likely need to update and/or re-deploy its custom kernel-mode driver.

BRIEF SUMMARY

The present invention extends to methods, systems, and computer program products for deploying firmware updates. In particular, embodiments of the present invention enable an administrator to have control over the deployment of a firmware update on a particular computing device without requiring a custom kernel-mode driver to be installed on the particular computing device.

An update provider can create a firmware update package executable that includes a firmware update utility that wraps a firmware update package. The firmware update package can be configured in accordance with the requirements of an OS-provided update framework. When the firmware update package executable is delivered to a computing device, it can be executed to launch the firmware update utility. The firmware update utility can then provide functionality for controlling the deployment of one or more firmware updates contained in the firmware update package. In addition to providing this control functionality, the firmware update utility can deliver the firmware update package to the OS-provided update framework to thereby cause the OS-provided update framework to convey the one or more firmware updates to the pre-boot environment for installation.

In some embodiments, the present invention is implemented as a method for deploying firmware updates on a computing device. A firmware update package executable is received at a computing device. The firmware update package executable includes a firmware update utility and a firmware update package. The firmware update package executable is executed to launch the firmware update utility on the computing device. The firmware update utility provides control functionality for the deployment of one or more firmware updates contained in the firmware update package. In conjunction with providing the control functionality, the firmware update utility delivers the firmware update package to an OS-provided update framework to thereby cause the one or more firmware updates to be conveyed from an OS context to a pre-boot context on the computing device.

In some embodiments, the present invention is implemented as computer storage media storing computer executable instructions which when executed implement a method for deploying firmware updates on a computing device. An update provider creates a firmware update package executable that includes a firmware update utility and a firmware update package and delivers the firmware update package executable to a computing device. The firmware update package executable is executed on the computing device to launch the firmware update utility on the computing device. The firmware update utility provides control functionality for the deployment of one or more firmware updates contained in the firmware update package. In conjunction with providing the control functionality, the firmware update utility delivers the firmware update package to an OS-provided update framework to thereby cause the one or more firmware updates to be conveyed from an OS context to a pre-boot context on the computing device.

In some embodiments, the present invention is implemented as a computing device that includes one or more processors and computer storage media storing computer executable instructions which when executed implement a method for deploying firmware updates on a computing device. This method includes: receiving, at an update agent, a firmware update package executable; executing the firmware update package executable to launch a firmware update utility contained in the firmware update package executable; and delivering, by the firmware update utility and to an OS-provided update framework, a firmware update package contained in the firmware update package executable to thereby cause the OS-provided update framework to deliver a capsule contained in the firmware update package to a pre-boot environment.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "firmware" should be given its standard meaning in the industry. For example, the firmware on a computing device may include the various components that are executed as part of the Unified Extensible Firmware Interface (UEFI) boot phases to cause the operating system to be loaded (i.e., the BIOS) and the firmware of a particular hardware device (e.g., the firmware on a graphics card). The term "computing device" can encompass any type of device that includes firmware and an operating system, but may primarily represent desktops, laptops, workstations, tablets, thin clients, servers, or other computing devices that run a version of the Windows operating system. Although the present invention will be described primarily in the context of a Windows-based computing device, embodiments can also be implemented in the context of other operating systems.

Figure 1:
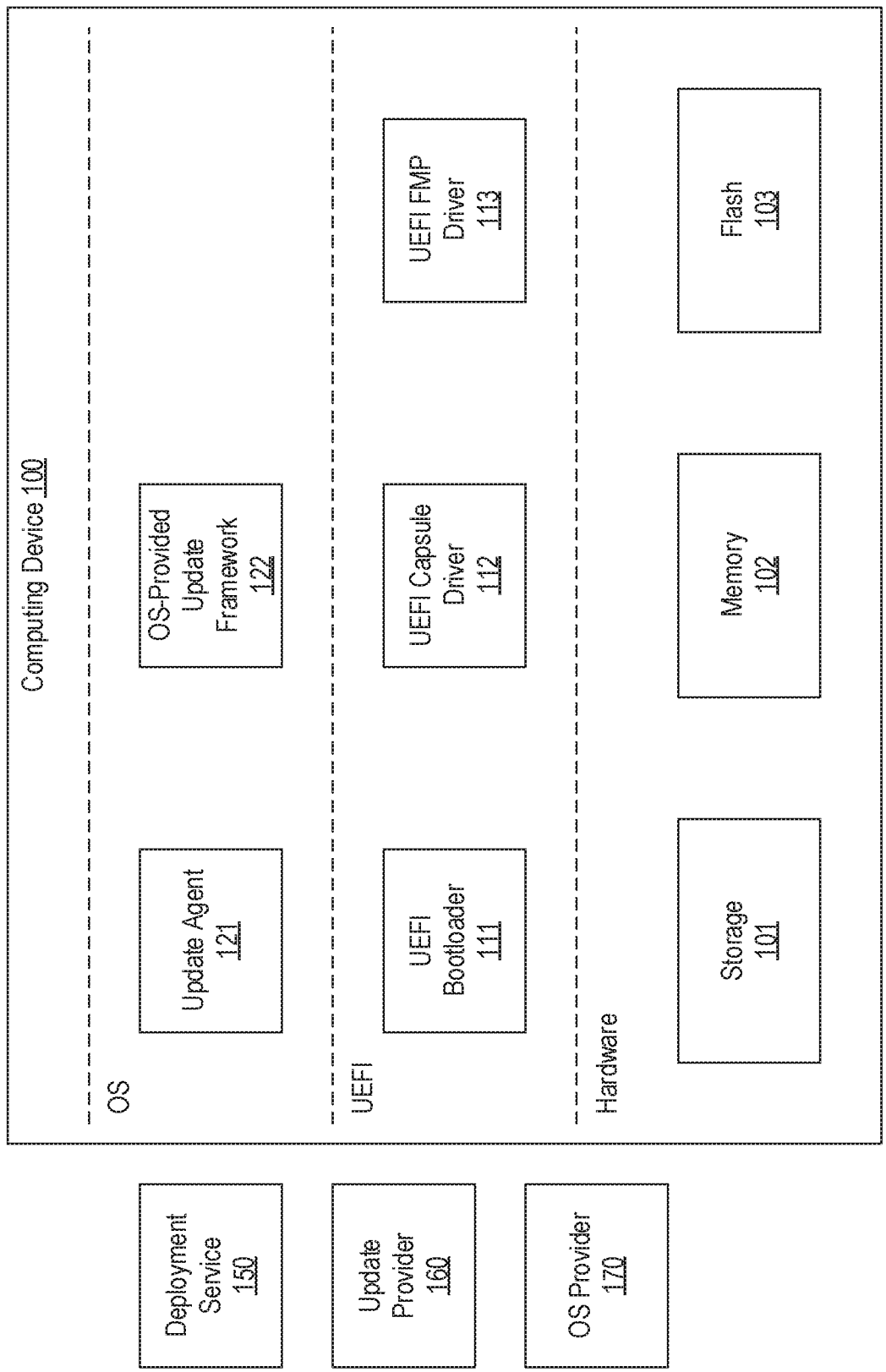
FIG. 1 illustrates an example computing environment in which embodiments of the present invention may be implemented.

FIG. 1 provides an example of a computing environment in which embodiments of the present invention may be implemented. This computing environment may include any number of computing devices 100 (only one of which is shown), a deployment service 150, an update provider 160 and an operating system (OS) provider 170. Deployment service 150 can represent any network software deployment service that be used to deliver updates to computing device(s) 100 such as Microsoft System Center Configuration Manager (SCCM) or the Dell SupportAssist services. Update provider 160 can represent any entity or individual that provides firmware updates (and likely other software updates) to computing device(s) 100 and may typically represent the OEM of the computing devices (e.g., Dell, HP, Lenovo, etc.). OS provider 170 can represent the provider of the OS on computing device(s) 100 and may therefore typically represent Microsoft.

FIG. 1 also illustrates various components that may exist on computing device 100 to enable embodiments of the present invention to be implemented. Computing device 100 includes various hardware such as a storage 101, memory 102 and flash 103. Storage 101 is intended to represent one or more computer storage media that can be used to perform the functionality described below. In common examples, storage 101 may be a hard disk drive or a solid-state drive. Memory 102 is intended to represent one or more computer storage media that function as physical memory on computing device 100. Flash 103 is intended to represent one or more computer storage media in which firmware is stored (e.g., the SPI flash that stores the system firmware or the flash of a particular device that stores the device's firmware).

Computing device 100 also includes various components that are executed in the UEFI (or pre-boot) context such as a UEFI bootloader 111, a UEFI capsule driver 112 and a UEFI FMP driver 112. Although the present invention will be described in the context of the UEFI, which is the current industry standard for BIOS, embodiments of the present invention could also be implemented in equivalent environments. Therefore, UEFI bootloader 111, UEFI capsule driver 112 and UEFI FMP driver 112 should be construed in accordance with the functionality they perform whether or not they perform the functionality in a UEFI environment.

Computing device 100 also includes various components that are executed in the OS context such as an update agent 121 and an OS-provided update framework 122. Update agent 121 can be any component that is configured to receive software updates, including firmware updates, to be installed on computing device 100 from deployment service 150 and may typically be provided by the OEM of computing device 100. In a common example, a company could use deployment service 150 to manage the deployment of firmware updates to all of the company's computing devices. In such cases, an administrator could use deployment service 150 to push a firmware update to an instance of update agent 121 running on any of the company's computing devices 100 to which the firmware update pertains.

OS-provided update framework 122 may represent the portion of the OS that manages the installation of updates on computing device 100. For example, OS-provided update framework 122 could represent the Windows Update functionality and the underlying components such as the Plug and Play Manager and a UEFI-compliant driver that is configured to convey capsules from the operating system context to the pre-boot context (e.g., via the UpdateCapsule( ) function).

Notably, in FIG. 1, computing device 100 is shown as not including a custom firmware update utility having a custom kernel-mode driver. For example, if computing device 100 were a Dell computing device, the Dell Flash Update Utility with its custom kernel-mode driver would not, or at least need not, be installed. In spite of this, and as described in detail below, embodiments of the present invention can still enable the type of control over the installation of a firmware update that could be accomplished using a custom firmware update utility having a custom kernel-mode driver. In short, embodiments of the present invention enable firmware updates to be deployed using the UEFI-based framework that the operating system provides without sacrificing control over the deployment process.

Figure 2A:
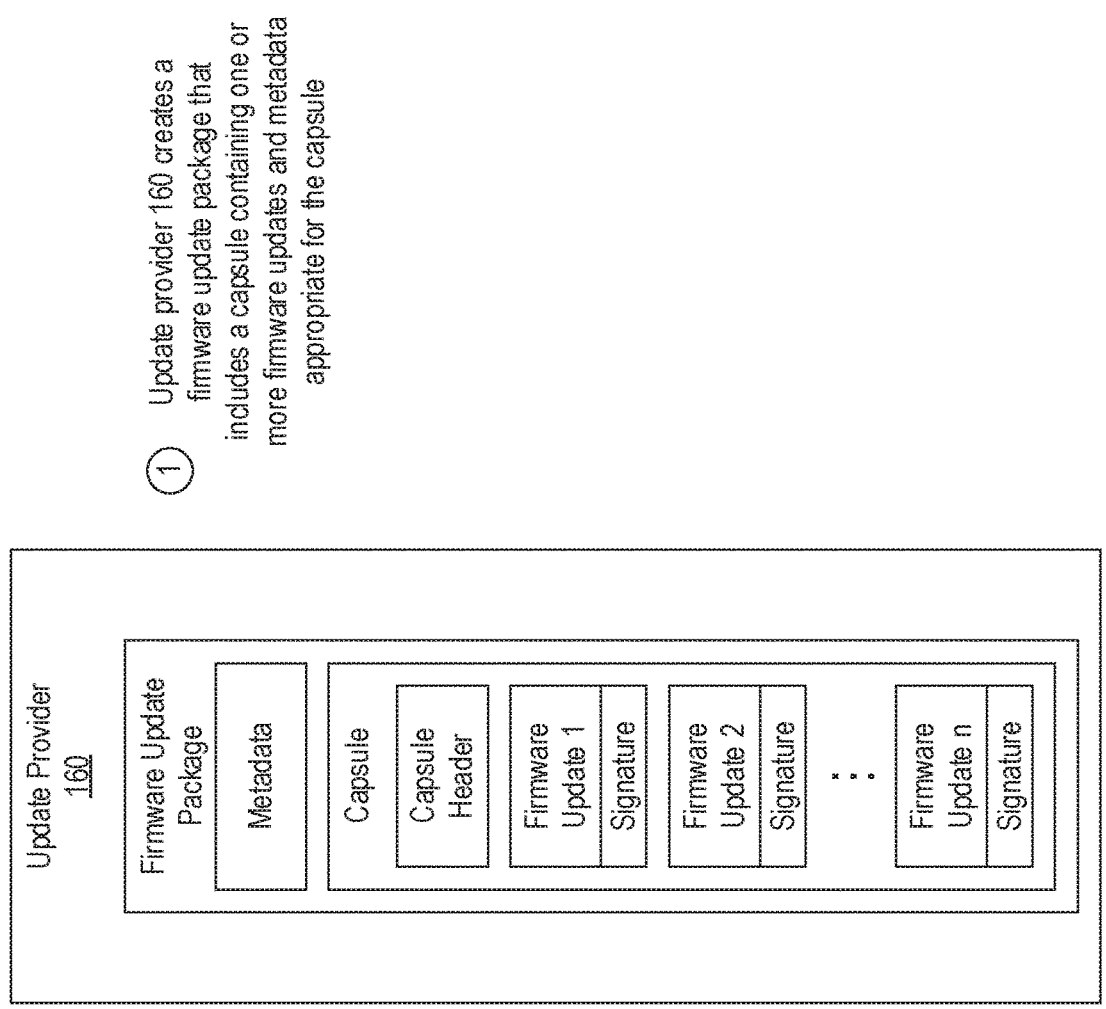
FIGS. 2A-2C provide an example of how an update provider may create a firmware update package executable that includes both a firmware update package and a firmware update utility.
Figure 2B:
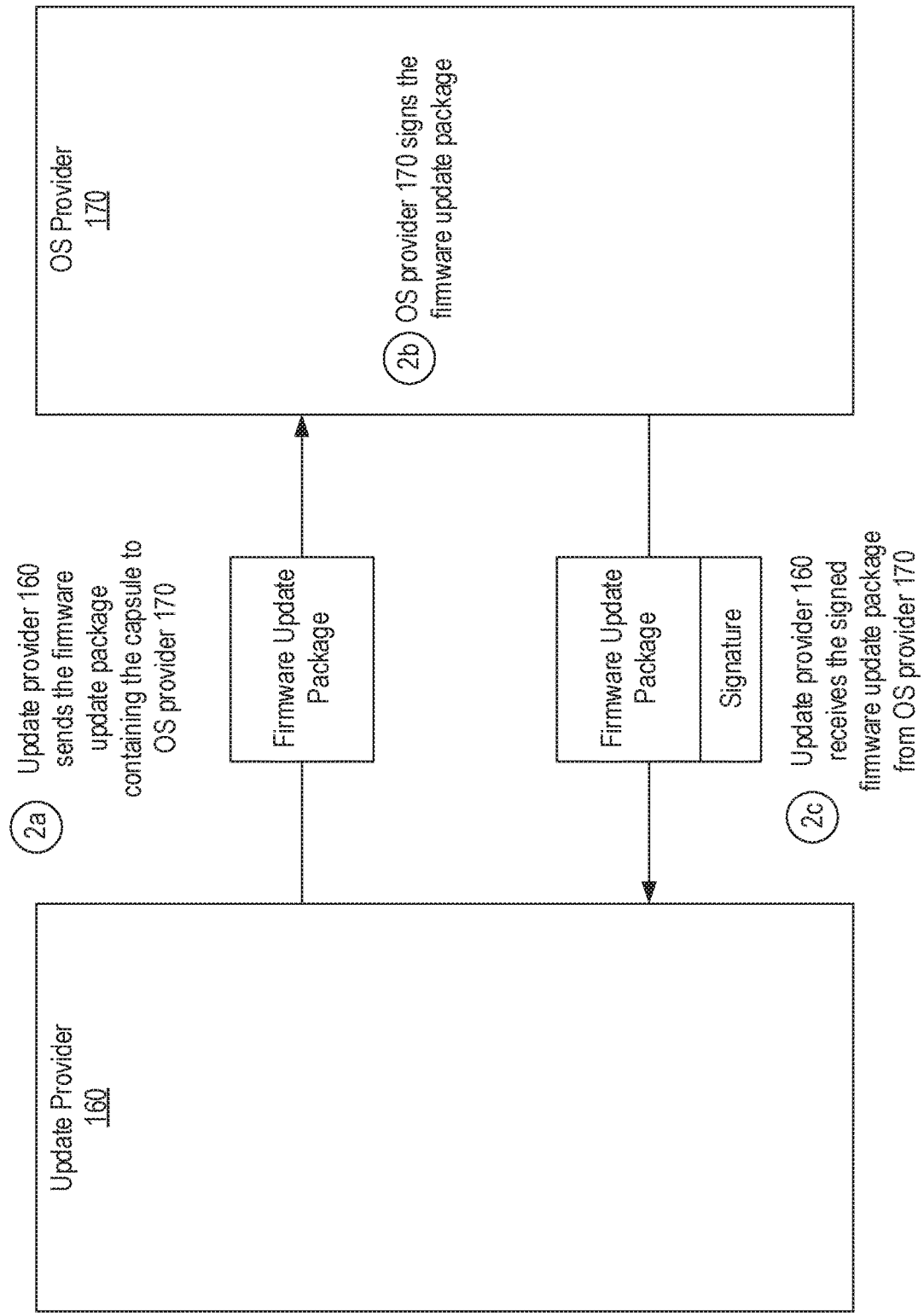
Figure 2C:
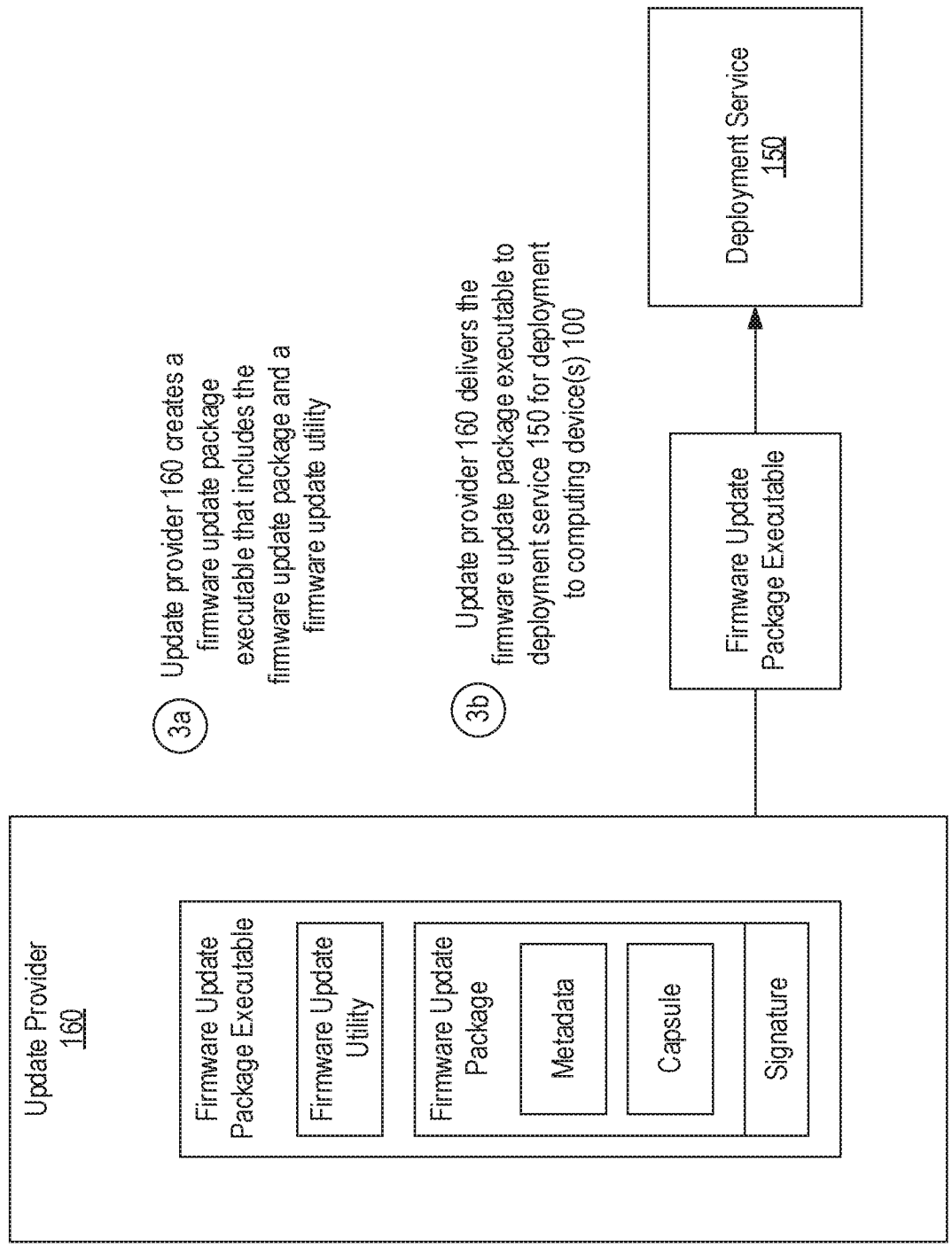

FIGS. 2A-2C provide an example of how update provider 160 may create a firmware update package executable that includes both a firmware update package and a firmware update utility. As an overview, when the firmware update package executable is deployed to computing device 100, the firmware update utility can be executed to provide control over the installation of each firmware update contained in the firmware update package while leveraging OS-provided update framework 122 to convey the firmware update(s) to the pre-boot environment.

Turning to FIG. 2A, in step 1, update provider 160 can create a firmware update package that includes a capsule containing one or more firmware updates. For example, Dell could create updated system firmware for some of its computing devices and could create a firmware update package containing the updates system firmware. The firmware update package may also include appropriate metadata.

FIG. 1 also shows that update provider 160 may sign each firmware update that it includes in the capsule and create an appropriate capsule header (e.g., in accordance with the UEFI specification). The signature for each firmware update can be used by the system firmware on computing device 100 to validate the firmware update prior to installation. The metadata included in the firmware update package can identify the contents of the capsule and provide information that may be required by the OS on computing device 100 to allow the capsule to be delivered to the system firmware. As an example, this metadata could be in the form of an INF file when the OS is Windows and may define the ESRT GUID for the class of firmware to which the capsule pertains (e.g., system firmware or device-specific firmware). Although not shown, update provider 160 may also sign the firmware update package (e.g., using an extended validation (EV) code signing certificate). In short, in Windows-based implementations, update provider 160 can create a firmware update package that conforms to Microsoft's requirements for distributing an update via the Windows Update framework.

Turning to FIG. 2B, in step 2a, update provider 160 can send the firmware update package containing the capsule to OS provider 170. For example, in Windows-based implementations, update provider 160 may submit the firmware update package to Microsoft's Partner Center to request that Microsoft certify it for deployment to Windows-based computing devices 100. In step 2b, and assuming OS provider 170 has certified the firmware update package, OS provider 170 signs the firmware update package (e.g., via a security catalog). Then, in step 2c, update provider 160 can retrieve the signed firmware update package from OS provider 170. Accordingly, as a result of steps 2a-2c, update provider 160 obtains a firmware update package that is signed or otherwise certified by OS provider 170 to thereby enable the firmware update package to be validated by the OS of computing device 100.

Turning to FIG. 2C, after retrieving the signed firmware update package, in step 3a, update provider 160 can create a firmware update package executable that includes the signed firmware update package and a firmware update utility. As described in greater detail below, the firmware update utility is configured to run in the OS context when the firmware update package executable is deployed to computing device 100 and can enable control over the deployment of the capsule to the firmware on computing device 100. In step 3b, update provider 160 can deliver the firmware update package executable to deployment service 150 to cause or enable the firmware update package executable to be distributed to computing devices 100.

FIGS. 3A-3F provide an example of how the firmware update package executable can be delivered to and processed on computing device 100 to cause the capsule to be deployed. In step 1a shown in FIG. 3A, update agent 121 receives the firmware update package executable from deployment service 150 and can store it on computing device 100. In step 1b, update agent 121 can execute the firmware update package executable to thereby cause the firmware update utility contained therein to be launched on computing device 100.

Figure 3A:
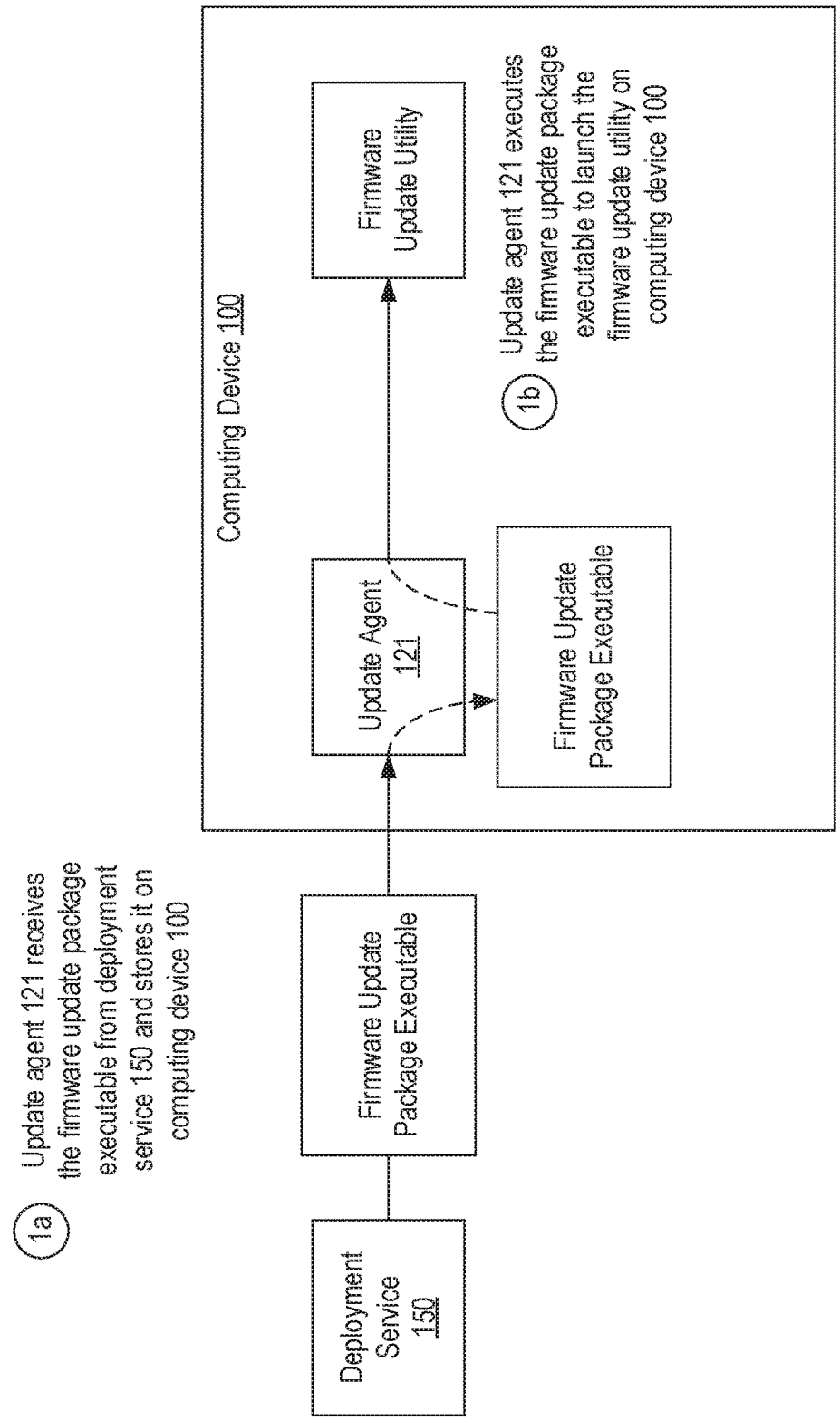
FIGS. 3A-3F provide an example of how a firmware update package executable can be delivered to and processed on a computing device.
Figure 3B:
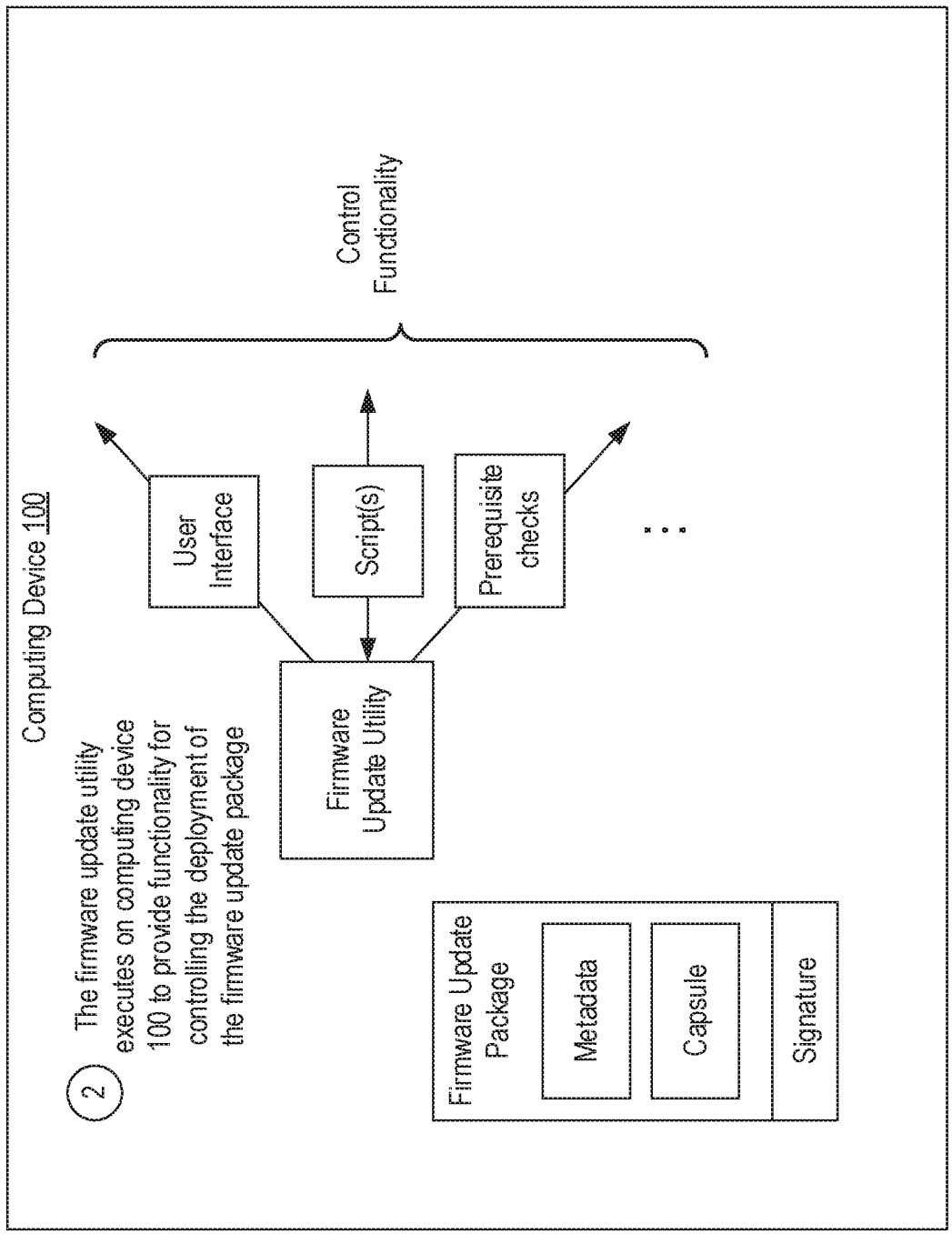

Turning to FIG. 3B, with the firmware update utility executing on computing device 100, in step 2, the firmware update utility can perform a wide variety of "control functionality" in conjunction with the deployment of the capsule to the firmware. For example, this control functionality may include generating a user interface on computing device 100 to present information, notices, instructions, etc. to the end user. This control functionality may also include receiving, generating and/or executing scripts to collect information about and/or to customize computing device 100 for the deployment of the capsule. As one example, the firmware update utility could provide a scriptable interface that update agent 121 could leverage to evaluate computing device 100 and dynamically generate a script to customize computing device 100 and/or the deployment of the firmware update(s). As another example, the firmware update utility could automatically generate a script which when executed customizes an ordering of the firmware updates in the capsule, prevents a firmware update in the capsule from being deployed, or otherwise tunes the deployment of the capsule to the particular computing device 100. As another example, this control functionality may include performing any number or type of prerequisite checks on computing device 100 such as verifying that the battery level exceeds a threshold or that computing device 100 is plugged in, performing a bit-locker check, verifying a system ID or other identifier of computing device 100 or of a particular device to confirm that the firmware updates pertain to the computing device or the particular device, checking a health of hardware components that the firmware update may impact, etc. In short, the firmware update utility provides a way for an administrator or end user to have control over or participate in the deployment of firmware updates even though the firmware updates are deployed as part of a firmware update package via OS-provided update framework 122.

Figure 3C:
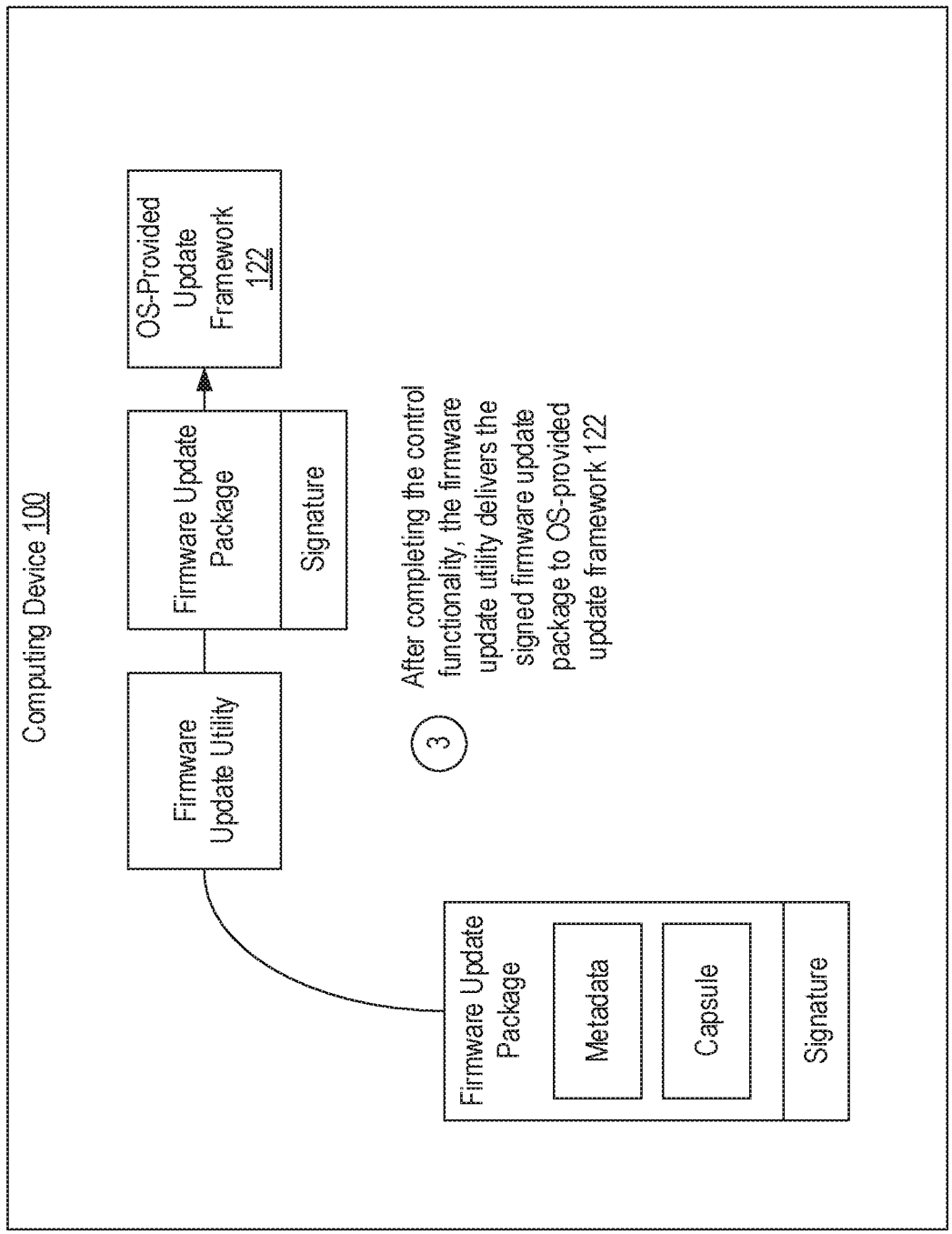
Figure 3D:
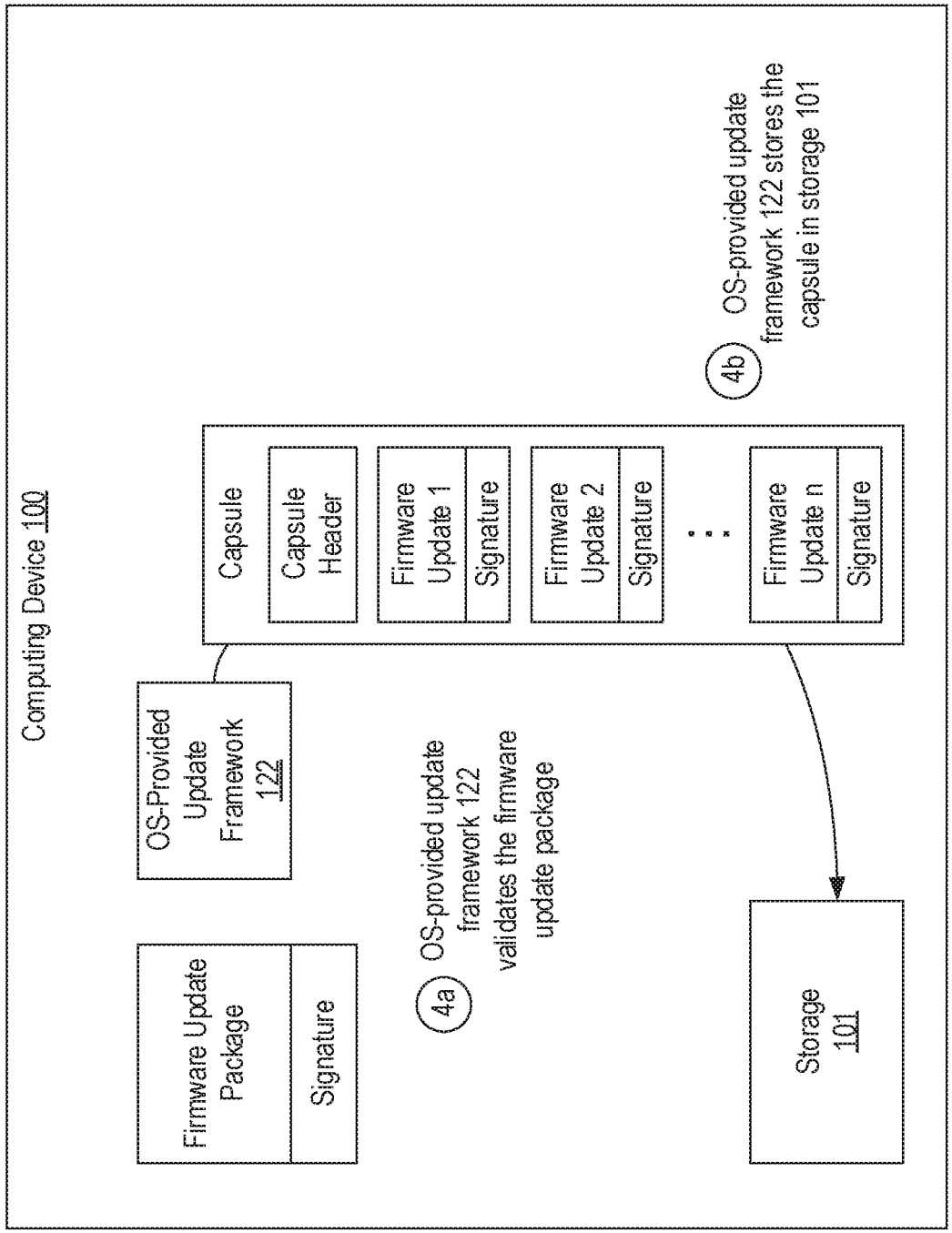

Turning to FIG. 3C, in step 3 and after completing the control functionality that may have been defined or requested for the deployment, the firmware update utility can deliver the signed firmware update package to OS-provided update framework 122. Then, in step 4a shown in FIG. 3D, OS-provided update framework 122 validates the firmware update package. This can entail verifying the signature of the firmware update package to confirm that OS provider 170 has certified the firmware update package. For example, step 4a may entail the Windows OS verifying that Microsoft certified the firmware update package that the OEM of computing device 100 created. In step 4b, which need not be performed after step 4a, OS-provided update framework 122 may store the capsule in storage 101 (e.g., in the Windows folder). Although not shown, OS-provided update framework 122 can employ the metadata contained in the firmware update package (e.g., the content of an INF) to determine how the payload of the firmware update package, which in this case is the capsule, should be handled. In the context of the present invention, OS-provided update framework 122 will determine from the metadata that the firmware update package includes a capsule and can therefore invoke the functionality for delivering the capsule to the pre-boot environment.

Figure 3E:
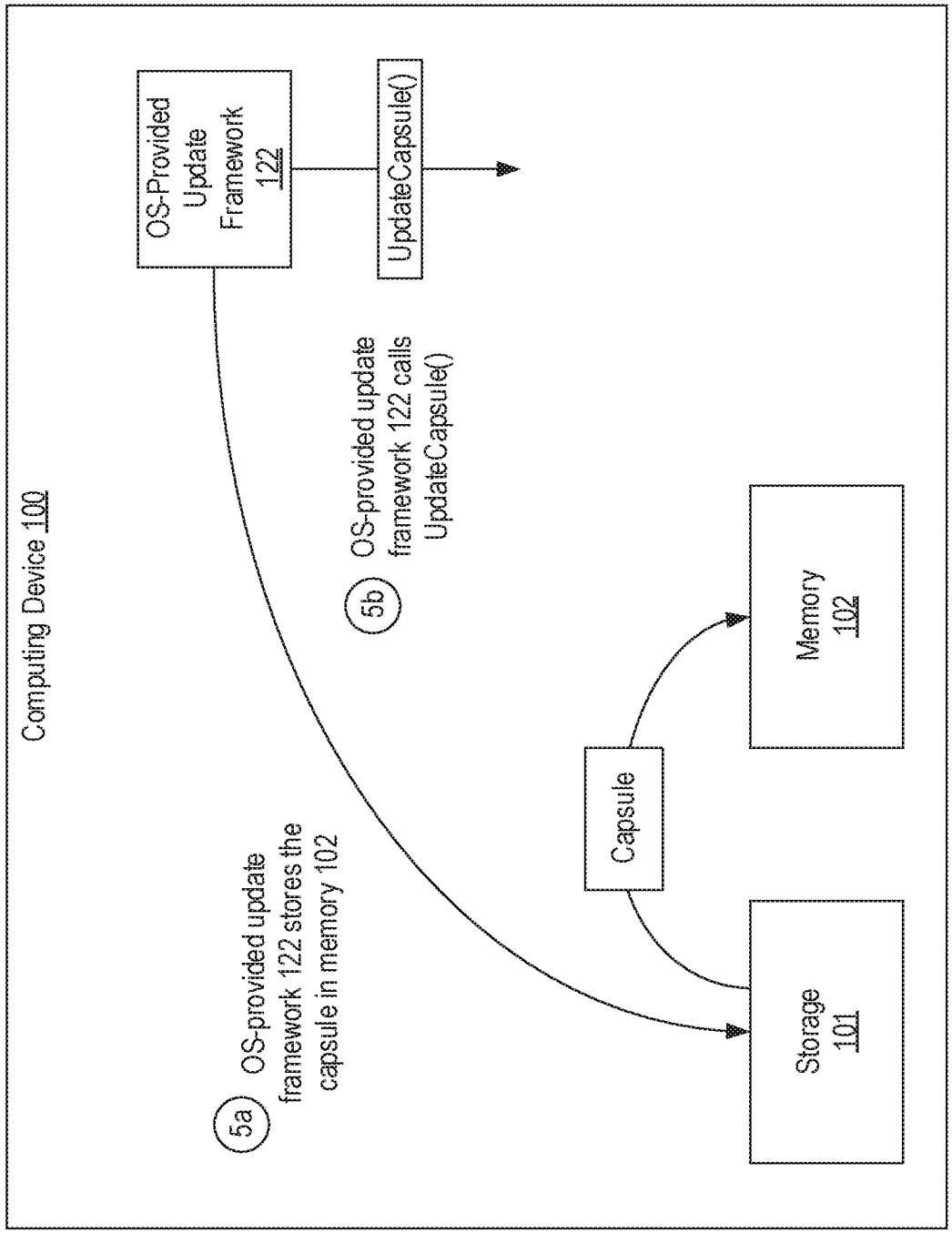

Turning to FIG. 3E, in step 5a, OS-provided update framework 122 stores the capsule in memory 102. Then, in step 5b, OS-provided update framework 122 may call the UpdateCapsule( ) function to notify the system firmware where the capsule is stored and to specify appropriate flags to cause the system firmware to process the capsule appropriately. Notably, because OS-provided update framework 122 is leveraged to cause the capsule to be copied to memory 102, it is not necessary for the firmware update utility to include a kernel-mode driver. In particular, the UpdateCapsule( ) function requires the capsule to be stored in contiguous regions of memory which could not be accomplished using a user-mode driver.

Figure 3F:
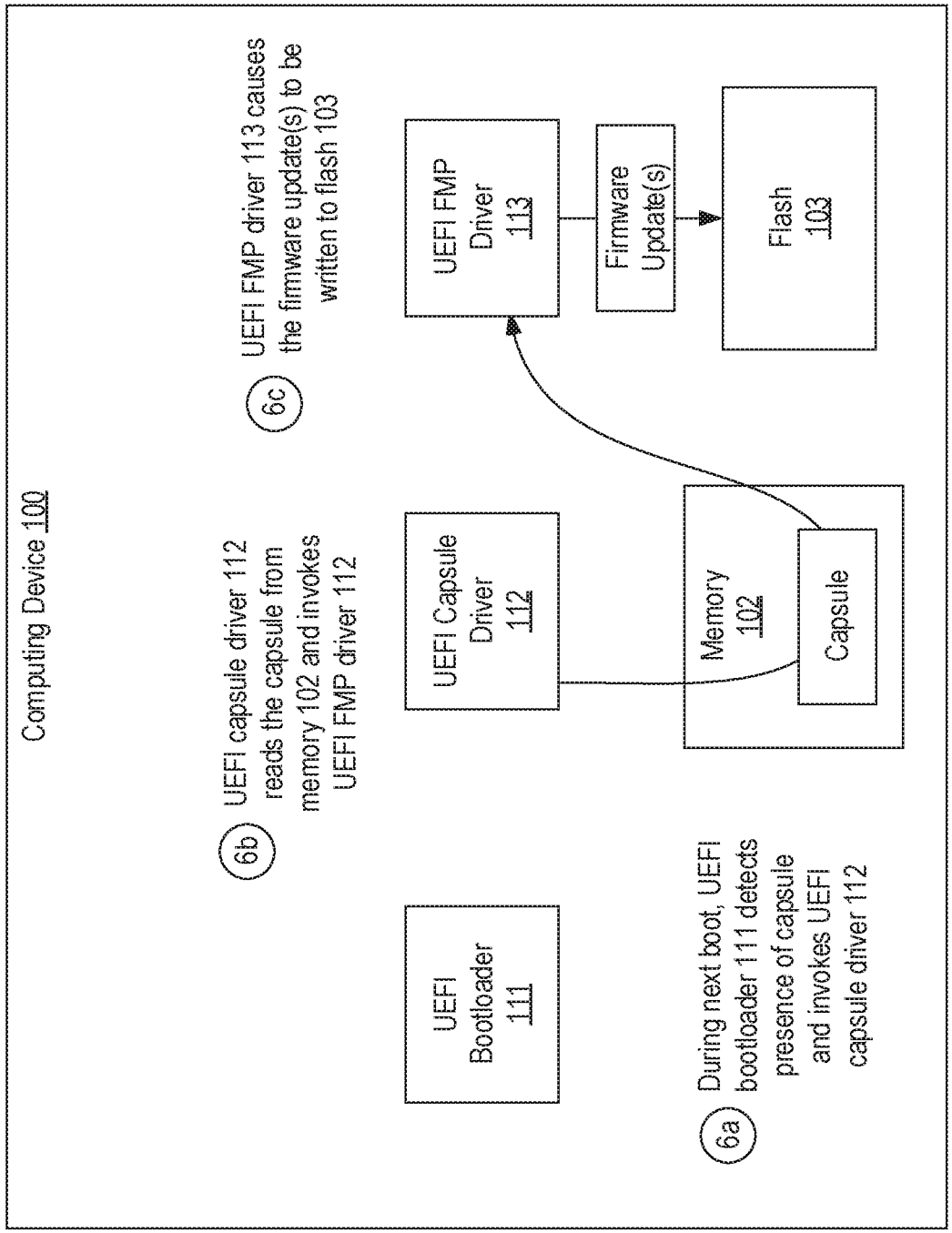

Turning to FIG. 3F, which represents functionality performed during the next reboot, in step 6a, UEFI bootloader 111 detects the presence of the capsule in memory 102 and can invoke UEFI capsule driver 112 to process the capsule. For example, UEFI bootloader 111 could detect flags that were set by OS-provided update framework 122 as part of calling UpdateCapsule( ) In step 6b, UEFI capsule driver 112 can read the capsule from memory 102 and invoke UEFI FMP driver 113. Finally, in step 6c, UEFI FMP driver 113 can cause the firmware update(s) contained in the capsule to be written to flash 103. Notably, steps 6a-6c are intended to represent standard UEFI functionality.

In summary, embodiments of the present invention provide a unique firmware update package executable that includes a firmware update package that can be delivered via OS-provided update framework 122 as well as a firmware update utility that can be executed to provide control functionality for the deployment of the capsule within the firmware update package. In this way, an organization can maintain control over the deployment of firmware updates on individual computing devices 100 without the difficulties or security vulnerabilities that a custom kernel-mode driver presents.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for deploying firmware updates on a computing device that includes an operating system (OS), the method comprising:
creating, by an update provider, a firmware update package executable by:
creating a capsule that contains one or more firmware updates;
creating a firmware update package that includes the capsule;
submitting the firmware update package to an OS provider for signing;
receiving the signed firmware update package from the OS provider; and
wrapping the signed firmware update package with a firmware update utility;
receiving, at an agent executing on the computing device, the firmware update package executable that includes the signed firmware update package that was wrapped with the firmware update utility;
initiating, by the agent, execution of the firmware update package executable to thereby cause the firmware update utility to be launched on the computing device;
providing, by the firmware update utility that has been launched on the computing device and prior to delivering the signed firmware update package that was wrapped with the firmware update utility to an OS-provided update framework, control functionality for deployment of the one or more firmware updates contained in the signed firmware update package that was wrapped with the firmware update utility, the control functionality including one or more of:
displaying a user interface on the computing device;
executing one or more scripts before delivering the signed firmware update package that was wrapped with the firmware update utility to the OS-provided update framework; and
performing one or more prerequisite checks before delivering the signed firmware update package that was wrapped with the firmware update utility to the OS-provided update framework; and
after providing the control functionality, delivering, by the firmware update utility, the signed firmware update package that was wrapped with the firmware update utility to the OS-provided update framework to thereby cause the capsule containing the one or more firmware updates to be conveyed from an OS context to a pre-boot context on the computing device only after providing the control functionality.

2. The method of claim 1, wherein the one or more scripts are dynamically generated.

3. The method of claim 1, wherein the OS provider is Microsoft and the OS-provided update framework is Windows Update.

4. The method of claim 1, wherein the update provider signs each of the one or more firmware updates in the capsule and creates a capsule header.

5. The method of claim 4, wherein the update provider also signs the firmware update package using an extended validation code signing certificate before submitting the firmware update package to the OS provider for signing.

6. The method of claim 5, wherein the update provider includes metadata in the firmware update package, the metadata including an INF file that defines an EFI System Resource Table (ESRT) globally unique identifier (GUID) for a class of firmware to which the one or more firmware updates in the capsule pertain.

7. One or more computer storage media storing computer executable instructions, which when executed, implement a method for deploying firmware updates on a computing device that includes an operating system (OS), the method comprising:
   creating, by an update provider, a firmware update package executable by:
      creating a capsule that contains one or more firmware updates;
      creating a firmware update package that includes the capsule;
      submitting the firmware update package to an OS provider for signing;
      receiving the signed firmware update package from the OS provider; and
      wrapping the signed firmware update package with a firmware update utility;
   delivering, to an agent that is executing on the computing device, the firmware update package executable that includes the signed firmware update package that was wrapped with the firmware update utility;
   initiating, by the agent on the computing device, execution of the firmware update package executable to thereby cause the firmware update utility to be launched on the computing device;
   providing, by the firmware update utility that has been launched on the computing device and prior to delivering the signed firmware update package that was wrapped with the firmware update utility to an OS-provided update framework, control functionality for deployment of the one or more firmware updates contained in the signed firmware update package that was wrapped with the firmware update utility, the control functionality including each of:
      displaying a user interface on the computing device;
      executing one or more scripts before delivering the signed firmware update package that was wrapped with the firmware update utility to the OS-provided update framework; and
      performing one or more prerequisite checks before delivering the signed firmware update package that was wrapped with the firmware update utility to the OS-provided update framework; and
   after providing the control functionality, delivering, by the firmware update utility, the signed firmware update package that was wrapped with the firmware update utility to the OS-provided update framework to thereby cause the one or more firmware updates to be conveyed from an OS context to a pre-boot context on the computing device only after providing the control functionality.

8. The computer storage media of claim 7, wherein the one or more scripts are dynamically generated.

9. The computer storage media of claim 7, wherein the firmware update utility does not include a kernel-mode driver.

10. A method for deploying firmware updates on a computing device that includes an operating system (OS), the method comprising:
   creating, by an update provider, a firmware update package executable by:
      signing each of one or more firmware updates;
      creating a capsule that contains the one or more signed firmware updates and a capsule header;
      creating a firmware update package that includes the capsule and metadata, the metadata including an INF file that defines an Extensible Firmware Interface (EFI) System Resource Table (ESRT) globally unique identifier (GUID) for a class of firmware to which the one or more signed firmware updates in the capsule pertain;
      signing, by the update provider, the firmware update package using an extended validation code signing certificate;
      submitting the firmware update package that is signed using the extended validation code signing certificate to an OS provider for signing with a security catalog;
      receiving the signed firmware update package that has been signed by the update provider using the extended validation code signing certificate and has been signed by the OS provider using the security catalog; and
      wrapping the signed firmware update package with a firmware update utility;
   receiving, at an agent executing on the computing device, the firmware update package executable that includes the signed firmware update package that was wrapped with the firmware update utility;
   initiating, by the agent, execution of the firmware update package executable to thereby cause the firmware update utility to be launched on the computing device;
   providing, by the firmware update utility that has been launched on the computing device and prior to delivering the signed firmware update package that was wrapped with the firmware update utility to an OS-provided update framework, control functionality for deployment of the one or more signed firmware updates contained in the signed firmware update package that was wrapped with the firmware update utility, the control functionality including one or more of:
      displaying a user interface on the computing device;
      executing one or more scripts before delivering the signed firmware update package that was wrapped with the firmware update utility to the OS-provided update framework; and
      performing one or more prerequisite checks before delivering the signed firmware update package that was wrapped with the firmware update utility to the OS-provided update framework; and
   after providing the control functionality, delivering, by the firmware update utility, the signed firmware update package that was wrapped with the firmware update utility to the OS-provided update framework to thereby cause the capsule containing the one or more signed firmware updates to be conveyed from an OS context to a pre-boot context on the computing device only after providing the control functionality.

* * * * *